US007400703B2

(12) United States Patent
Yatsenko

(10) Patent No.: US 7,400,703 B2

(45) Date of Patent: Jul. 15, 2008

(54) METHOD AND SYSTEM FOR CONTROLLING RADIATION INTENSITY OF AN IMAGING SYSTEM

(75) Inventor: Dimitri V Yatsenko, Salt Lake City, UT (US)

(73) Assignee: General Electric Company, Schenectady, NY (US)

( * ) Notice: Subject to any disclaimer, the term of this patent is extended or adjusted under 35 U.S.C. 154(b) by 34 days.

(21) Appl. No.: 11/464,061

(22) Filed: Aug. 11, 2006

(65) Prior Publication Data

US 2008/0037709 A1 Feb. 14, 2008

(51) Int. Cl.
*G01N 23/04* (2006.01)

(52) U.S. Cl. ......................................... 378/62; 378/146

(58) Field of Classification Search ................. 378/378, 378/14–146

See application file for complete search history.

(56) References Cited

U.S. PATENT DOCUMENTS

| | | | | |
|---|---|---|---|---|
| 2,767,323 | A | 10/1956 | Stava | |
| 4,063,100 | A | 12/1977 | Williams | |
| 5,040,202 | A | 8/1991 | Scheid | |
| 5,812,629 | A * | 9/1998 | Clauser | 378/62 |
| 2006/0062353 | A1 | 3/2006 | Yatsenko | |

OTHER PUBLICATIONS

Tong Xu, "Patient-Specific region-of-Interest Fluoroscopy Device for X-Ray Dose Reduction", Radiology, vol. 226, No. 2, Feb. 2003, pp. 585-592.

Salem A. Sassi, "Moving Segments Region of Interest Attenuator for X-Ray Flouroscopy", Medical Physics, vol. 26, No. 1, Jan. 1999, pp. 19-26.

Yatesenko, "Spatial X-ray Gatling: a Tool for Automated Regional Exposure Management", Masters Thesis, University of Utah, 2005.

Yatsenko, "Spatial X-ray Gatling: a Tool for Automated Regional X-ray Exposure Management", Proceedings of International Society for Optical Engineering (SPIE), Jun. 2006.

* cited by examiner

*Primary Examiner*—Hoon Song

(57) ABSTRACT

A system for and a method of controlling a spatial distribution of radiation intensity in a beam of radiation is provided. The system includes a control device located to receive the initial beam of radiation from the radiation source. The control device includes a first radiation absorbing structure located at a position in generally superposing alignment relative a position of a second radiation absorbing structure. Each first and second radiation absorbing structure is operable to independently articulate. The modulator configuration signal is operable to cause adjustment of the position of at least one of the first and second radiation absorbing structures relative to the other so as to selectively adjust a spatial distribution of radiation intensity of a modulated beam.

20 Claims, 7 Drawing Sheets

METHOD AND SYSTEM FOR CONTROLLING RADIATION INTENSITY OF AN IMAGING SYSTEM

BACKGROUND OF THE INVENTION

This subject matter herein generally relates to an imaging system and more particularly to a method and system for controlling an intensity of a radiation beam employed in the imaging system. The method and system for controlling radiation intensity may be used in applications related to medical and industrial imaging.

A certain conventional radiation imaging system generally includes an radiation source configured to project a beam of electromagnetic radiation toward a subject being imaged. The radiation beam is typically collimated so as to pass through a region of interest of a subject being imaged, such as a patient. As the radiation beam passes through the imaged subject, the imaged subject attenuates the radiation beam intensity. Upon passing through the imaged subject, the attenuated radiation beam impinges upon an array of radiation detectors. The intensity of the radiation beam received at the array of radiation detectors is dependent upon the attenuation of the X-ray beam by the imaged subject. With a conventional digital type of radiation detector, each of an array of radiation detector elements, or pixels, produces a separate electrical signal that is a measurement of the attenuation of the radiation beam intensity at that location of the radiation detector. The attenuation measurements from all the detector pixels are acquired separately to produce a transmission profile. In fluoroscopy, such beam attenuation measurements are repeated successively to create a real-time video of the radiation projection of the imaged subject.

However, conventional radiographic or fluoroscopic imaging systems have drawbacks. For example, a typical radiation intensity across a cross-section of an initial radiation beam from a conventional imaging radiation system is nearly uniform such that the imaged target can receive a radiation dose irrespective of the varying thickness of the target, regardless of movement of the subject being imaged, and/or regardless of the area of most interest to the operator.

A sufficiently high dose of radiation intensity is typically transmitted through the imaged subject so as to ensure that, after interacting with the imaged subject, the attenuated radiation leaving the imaged subject will have sufficient number of X-ray photons to reach the radiation detector and produce an image with sufficient contrast. However, exposure to reduced intensities of radiation may only be needed to adequately image an area of interest (e.g., thinner portions) of the image subject, or to acquire an image for reference only that does not require high spatial or gray scale resolution, or where little change occurs from frame to frame of the imaged subject.

BRIEF DESCRIPTION OF THE INVENTION

There exists a need to provide a system and method of controlling a spatial distribution of radiation intensity which addresses the drawbacks described above. The control system should require minimal user input or intervention and minimize distortion of the acquired images. The system should produce the desired reduction in radiation intensity effect for a wide range of imaging techniques, anatomies, and projection angles with minimal delays in the workflow in the operating room. The system should also allow acquisition of images in fast succession. As projections through the anatomy change, the system should be able to readily reconfigure the intensity of the radiation beam. The system should not require an increase in the size of the imaging system or reduce the field of view of the imaging system. The system should not reduce continuous use of the imaging system. The above-mentioned needs are addressed by the embodiments of a apparatus and method described in the following description.

In one embodiment, a method for selectively controlling a spatial distribution of radiation intensity of an output radiation beam of an imaging device operable to create an output image of a subject is provided. The method includes the acts of passing an initial radiation beam through a control device comprising a first radiation absorbing structure in superposing alignment relative a second radiation absorbing structure, each first and second radiation absorbing structure configured to independently articulate relative to one another; adjusting a position of the first radiation absorbing structure in relation to a position of the second radiation absorbing structure in accordance to a modulator configuration signal; creating a combined transmittance pattern that includes a moiré pattern having a lower frequency of transmittance relative to a remainder of the combined transmittance pattern; adjusting a moiré pattern in the combined transmittance field so as to selectively adjust the distribution of radiation intensity of the modulated beam leaving the control device.

In another embodiment, a system for adjusting an intensity of an initial radiation beam received from a radiation source of an imaging system is provided. The system comprises a control device that includes a first radiation absorbing structure located at a position in superposing alignment relative a position of a second radiation absorbing structure, each first and second radiation absorbing structure configured to independently articulate. The system also includes a beam processor configured to create a modulator configuration signal to cause adjustment of the position of at least one of the first and second radiation absorbing structures relative to the other so as to selectively create a combined transmittance pattern that includes a moiré pattern having a lower frequency field of transmittance not found in a transmittance field produced from one of the first and second radiation absorbing structures.

In yet another embodiment, an X-ray imaging system is provided. The system includes an X-ray source transmitting an initial beam of radiation, a control device positioned in general alignment to receive the initial beam from the X-ray source, an X-ray detector located in a path of an modulated X-ray beam; and a beam processor connected in communication with the X-ray detector and the control device. The control device includes a first independently articulating radiation absorbing structure that defines a first transmittance pattern of radiation, and a second independently articulating radiation absorbing structure that defines a second transmittance pattern of radiation. The first and second independently articulating radiation absorbing structures are superimposed in a manner so as to selectively define a combined transmittance pattern of a modulated X-ray beam from the control device. The combined transmittance pattern includes a moiré pattern having a lower frequency transmission field not present in the first and second transmittance patterns of radiation of the first and second radiation absorbing structures, respectively. The beam processor is operable to create and communicate a modulator configuration signal operable to adjust the moiré pattern in the combined transmittance pattern of the control device in accordance to a selected parameter from the group consisting of an image detector, an operator input, a location of interest in the imaged subject, a location of expected new information in the imaged subject, locations of regions of motion in the imaged subject, and a location of radiation-sensitive tissue in the imaged subject.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part thereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Figure 1:
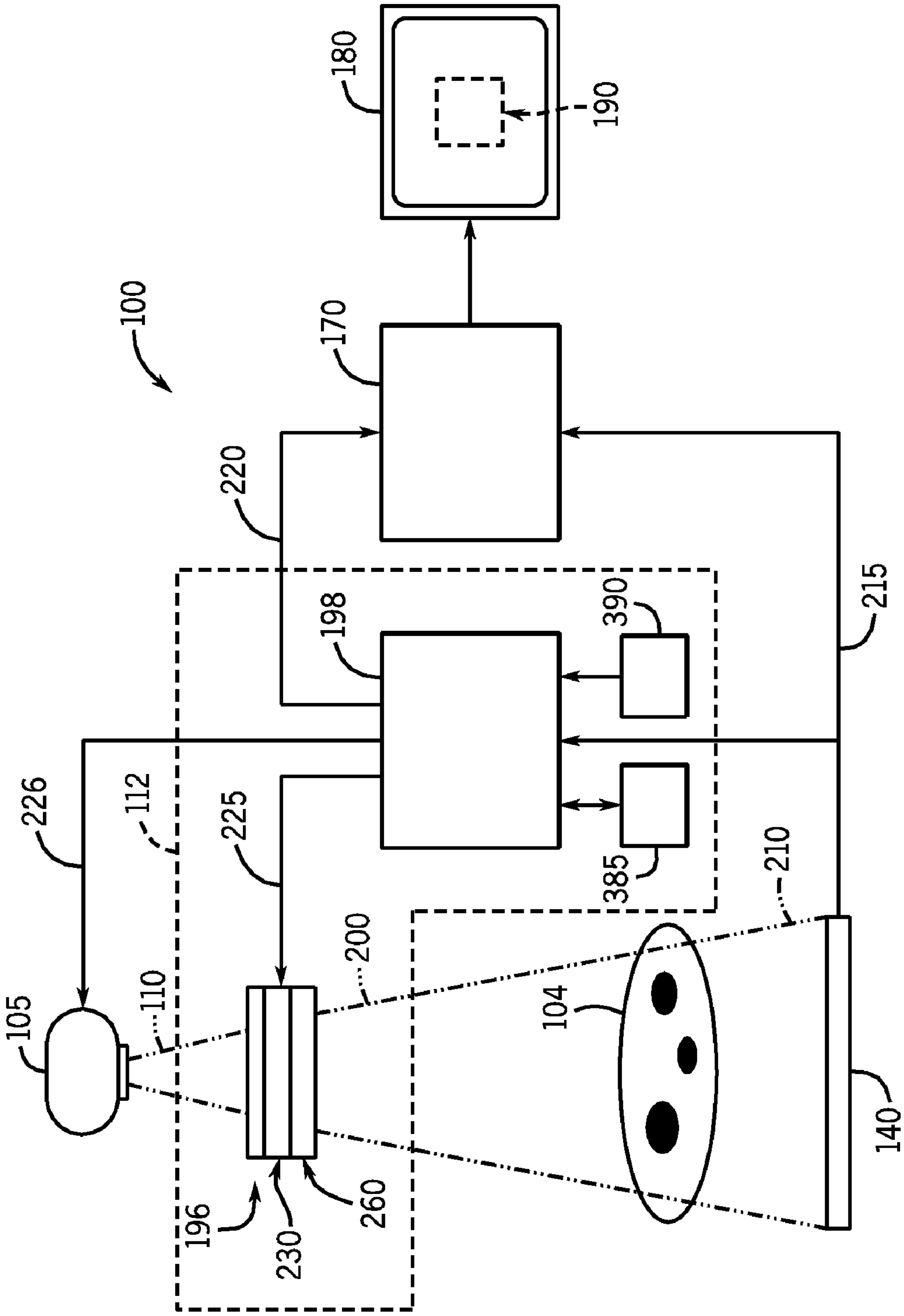
FIG. 1 illustrates a schematic diagram of an embodiment of a radiation imaging system that includes a system for controlling a spatial distribution of radiation intensity.

FIG. 1 illustrates a schematic diagram of an embodiment of an imaging system 100 operable to generate a radiological image of a subject 104. The illustrated imaging system 100 performs radiological imaging by passing X-rays through the subject 104. Yet, the type of imaging employed by the imaging system 100 can vary.

The imaging system 100 generally includes a radiation source 105 operable to produce an initial radiation beam 110 (e.g., X-rays), and control system 112 for regulating a distribution of radiation entering the imaged subject 104. The imaging system 100 further includes a radiation detector 140, an image processor 170, and a display device 180 operable to display a output image 190 based at least on the attenuation of radiation leaving the imaged subject 104.

Referring to FIG. 1, the radiation source 105 typically generates and transmits the initial beam 110 with a distribution of radiation intensity nearly uniform across its cross-section, although the distribution may not be "completely" uniform for various reasons, for example due to the heel effect.

As shown in FIG. 1, the control system 112 generally includes a control device 196 in communication with a beam processor 198 having a technical effect of automatically regulating a cross-sectional distribution of radiation intensity of an output modulated beam 200. The control device 196 is located between the radiation source 105 and the imaged subject 104. At least some portion of the initial radiation beam 110 passes through the control device 196 so as create the output modulated beam 200. The modulated beam 200 passes through the imaged subject 104, where the modulated beam 200 is attenuated to various degrees by the features of the imaged subject 104 to result in a residual beam 210.

Still referring specifically to FIG. 1, the radiation detector 140 is located to receive the residual beam 210 passed through the subject 104. The detector 140 is generally a device capable of measuring or recording the intensity pattern projected by residual beam 210. For example, the detector 140 can include a solid-state X-ray detector, or an image intensifier coupled with a charged-coupled device digital video camera. Based at least on measured intensities in the residual beam 210, the detector 140 generates a residual intensity signal 215 representative of the measured radiation intensity pattern for communication to the image processor 170. For example, residual intensity signal 215 may comprise electronic data representing various residual beam intensities detected by the detector 140. The detector 140 communicates the residual intensity signal 215 to at least one of the beam processor 198 and the image processor 170.

The beam processor 198 is generally configured to generate a beam intensity signal 220 representative of a distribution of radiation intensity in the modulated beam 200 for communication to the image processor 170. The beam processor 198 is also configured to generate and communicate a modulator configuration signal 225 to the control device 196 and a source configuration signal 226 to the radiation source 105. The modulator configuration signal 225 is operable to instruct the control device 196 to adjust the distribution of radiation intensity of the modulated beam 200 leaving the control device 196. In a similar manner, the source configuration signal 226 is operable to instruct the radiation source 105 to adjust an intensity of the initial radiation beam 110. The beam processor 198 may also be operable to receive and perform image processing of the residual intensity signal 215 from the detector 140 and so as to automatically update the modulator configuration signal 225 and/or the source configuration signal 226 for a subsequent image acquisition of the subject 104. The beam processor 198 can be embodied in a general-purpose microprocessor, a software component, or a specialized digital signal processing ("DSP") circuit, for example. The beam processor 198 may also be embedded in a system supplying processing for the imaging system 100, which may also perform additional tasks for the imaging system 100 such as those performed by the image processor 170.

Still referring to FIG. 1, the image processor 170 is generally operable to create the output image 190 of the imaged subject 104 for viewing on the display device 180. The image processor 170 can create the output image 190 from the residual intensity signal 215 alone or based on both the residual intensity signal 215 and the beam intensity signal 220. The image processor 170 can comprise any processor capable of combining two or more image signals into a third image signal using image algebra operators. For example, image processor 170 can include a specialized hardware component, a programmable device, or an embedded software component running on a general-purpose microprocessor, for example.

Figure 2:
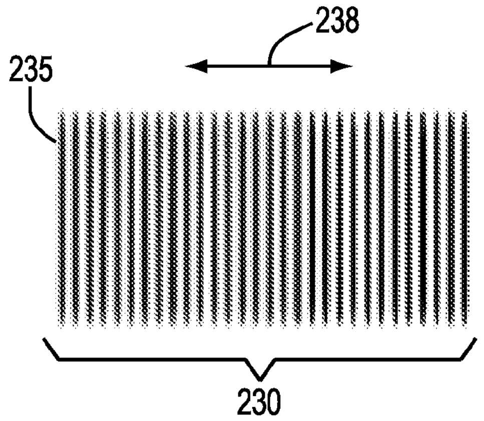
FIG. 2 illustrates a schematic diagram of an embodiment of a radiation absorbing structure of microstructures.

The control device 196 is generally configured to attenuate the initial beam 110 from the radiation source 105 in accordance to instructions in the modulator configuration signal 225 to various degrees and various fashions (e.g., spatially). The technical effect of the control device 196 is to create of modulated beam 200 of desired distribution of radiation intensity in accordance to feedback received via the modulator configuration signal 225 from the beam processor 198. As shown in FIG. 1, one embodiment of the control device 196 comprises at least one independently articulated structure 230. Each structure 230 is disc-shaped. Yet, the shape of the structure 230 can vary. Referring now to FIG. 2, an embodiment of the structure 230 comprises an arrangement (e.g., two-dimensional or three-dimensional) of radiation absorbing microstructures 235. The radiation absorbing microstructures 235 are sufficiently fine such that their individual shadows of attenuated radiation can become blurred due to the finite size of the focal spot (not shown) of the initial radiation beam 110, induced motion (illustrated by arrow and reference 268) of the structure 230, resolution limits of the imaging system 100, or a combination of these effects. The types (e.g., periodic patterns, non-periodic patterns, etc.) of microstructures 235 can include gratings, grids, or dot screens.

Still referring to FIG. 2, the embodiment of the microstructures 235 is comprised of a material generally opaque to radiation (e.g., X-rays) so as to absorb all or a large portion of impinging radiation (e.g., X-ray photons). The size of radiation absorbing microstructures 235 are selected such that their individual shadows of attenuated radiation are sufficiently small to be blurred by natural or induced spatial blurring.

Figure 3:
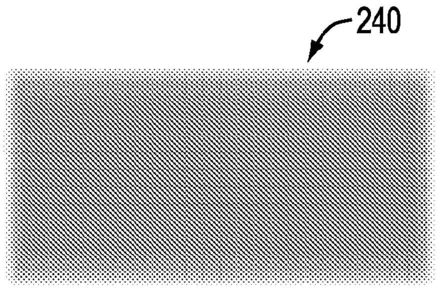
FIG. 3 illustrates an example of an expected transmission field of radiation produced by the structure of absorbing microstructures shown in FIG. 2.

A transmittance of a structure 230 of microstructures 235 at a given point is a fraction of radiant energy that, having entered the structure 230 of microstructures 235 at that point, passes through it. FIG. 3 illustrates an example of a spatial distribution of radiation intensity or transmittance field or transmittance pattern 240 across the structure 230 of microstructures 235.

Figure 4:
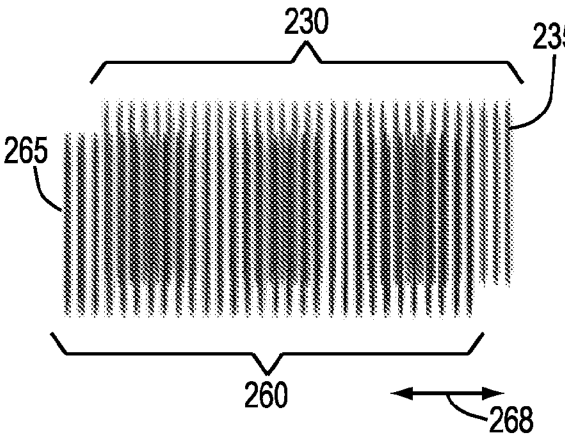
FIG. 4 illustrates an embodiment of a first structure of radiation absorbing microstructures positioned at an offset arrangement with respect to a generally identical second structure of radiation absorbing microstructures.

FIG. 4 illustrates an embodiment of the control device 196 that comprises a first independently articulating structure 230 of microstructures 235 superposing a second independently articulating structure 260 of microstructures 265 of construction similar to the structure 230 of microstructures 235 described above, subjected to motion (illustrated by arrow and reference 268). The structures 230 and 260 of radiation absorbing microstructures 235 and 260, respectively, are arranged such that when superposed with respect to one another, the transmittance fields of each structure 230 and 260 of microstructures 235 and 260, respectively (each transmittance field expected to be similar to that shown in FIG. 3), are non-linearly combined. Transmittances of the superposed structures combine non-linearly (e.g., multiplicatively), but not always strictly multiplicatively due to polychromaticity of the transmitted radiation, for example.

Figure 5:
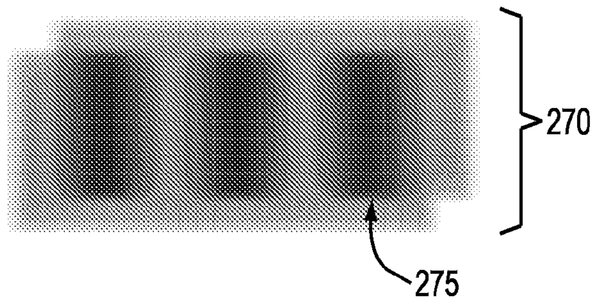
FIG. 5 shows an example of an expected combined transmittance field or pattern of radiation produced by the arrangement of first and second structures shown in FIG. 4.

FIG. 5 illustrates an example of a combined transmittance pattern 270 expected by the superposition of the structures 230 and 260 of microstructures 235 and 265, respectively, subjected to spatial blurring or smoothing. The combined transmittance pattern 270 includes a moiré pattern 275 having a field of lower frequency transmittance not present in the expected transmittance field of each structure 230 and 260 of microstructures 255 and 260, respectively, by themselves (See FIG. 3). The moiré pattern 275 can be defined as a low-frequency spatial contents or field of transmittance contained within the combined transmittance field produced by superposing two or more transmittance fields each comprised of only high-frequency spatial contents or fields of transmittance.

It should be understood that the combined transmittance pattern 270 illustrated in FIG. 5 is by example and is not limiting. Also, although independently articulated structures 230 and 260 of microstructures 235 and 265, respectively, are illustrated, it is understood that more than two structures 230 and 260 of microstructures 235 and 265 can be employed.

Referring to FIG. 5, the moiré pattern 275 possesses many fascinating and useful properties. For example, the moiré pattern 275 may change significantly in response to small transformations in the structures 230 and 260 of microstructures 235 and 265, respectively (See FIG. 4). The control device 196 of the imaging system 100 (See FIG. 1) controls the generation of the moiré patterns 275 by applying this property in reverse: small controlled changes in the positions of the structures 230 and 260 of microstructures 235 and 265 relative to one another within the array of structures 230 and 260. The controlled creation of the moiré patterns 275 allow for increased variation in the combined or modulated transmittance field 270 (See FIG. 5) and increased variation in the associated spatial distribution of radiation intensity of the modulated beam 200 leaving the control device 196 (See FIG. 1).

For example and still referring to FIGS. 4 and 5, let $g_k(x,y)$ with $k=1, 2, \ldots, K$ represent the high frequency transmittance fields of K basis structures 230 of microstructures 235 or the basis structure 260 of microstructures 265, respectively. When the structures 230 or 260, respectively, are superposed, their combined transmittance field G(x,y) becomes $G(x,y)\approx\Pi\, g_k(x,y)$ for $k=1, 2, \ldots, K$. Here (x,y) denotes two-dimensional spatial coordinates in the cross-section of the combined transmittance field or pattern 270 of the modulated beam 200 (See FIG. 1). If the basis structures 230 and 260 of microstructures 235 and 265 are spatially distributed in a periodic or repeating arrangement, the resulting combined transmittance field G(x, y) may include high-frequency component or transmittance field $G_{hi}(x,y)$, as well as a low-frequency component or transmittance fields $G_{lo}(x,y)$, referred to as the moiré pattern above, that is not present in the transmittance fields of any of the basis structures 230 and 260 alone such that $G(x,y)=G_{lo}(x,y)+G_{hi}(x,y)$. The moiré pattern or patterns 275 associated with the above-described moiré effect is most useful for X-ray beam modulation when the high-frequency component $G_{hi}(x,y)$ of the combined transmittance field 270 is effectively reduced or removed while the magnitude of the low-frequency component $G_{lo}(x,y)$ is maintained or unaffected. In an embodiment of the control device 196, low-pass filtration can be performed on the combined transmittance field 270 or the residual intensity signal 215 using low-pass filters (optical, analog, or digital) or motion blurring or a combination of both so as to remove the high-frequency component $G_{hi}(x,y)$ from the combined transmittance field or pattern 270, leaving the low-frequency component $G_{lo}(x,y)$ unaffected. Following low-pass filtration, the combined transmittance field or pattern 270 is transformed as follows: $G(x,y)*h(x,y)=(G_{lo}(x,y)+G_{hi}(x,y))*h(x,y)\approx G_{lo}(x,y)$. Here (*) denotes two-dimensional convolution and h(x,y) is a low-pass kernel.

Referring back to FIG. 1, an example of the low-pass filtration described above is performed by locating the control device 196 in the near vicinity of the radiation source 105, and by constructing the radiation absorbing microstructures 235 and 265 (See FIG. 4) to be somewhat smaller in width than the focal spot of the initial radiation beam 110. This low-pass filtration is generally due to the spatial blurring effect associated with the penumbra of the initial beam 110. Another example of the low-pass filtration is performed by subjecting the combined transmittance field 270 or the residual intensity signal 215 to motion blur. As an example, FIG. 5 illustrates the moiré patterns 275 created by the superposition of the structures 230 and 260 that are expected to remain in the combined transmittance field or pattern 270 when the structures 230 and 260 are oscillated in a direction 268.

Having described the general construction of an embodiment of the imaging system 100 and the control device 196, the following is a general description of the operation of the control device 196 in combination with the imaging system 100.

Figure 6:
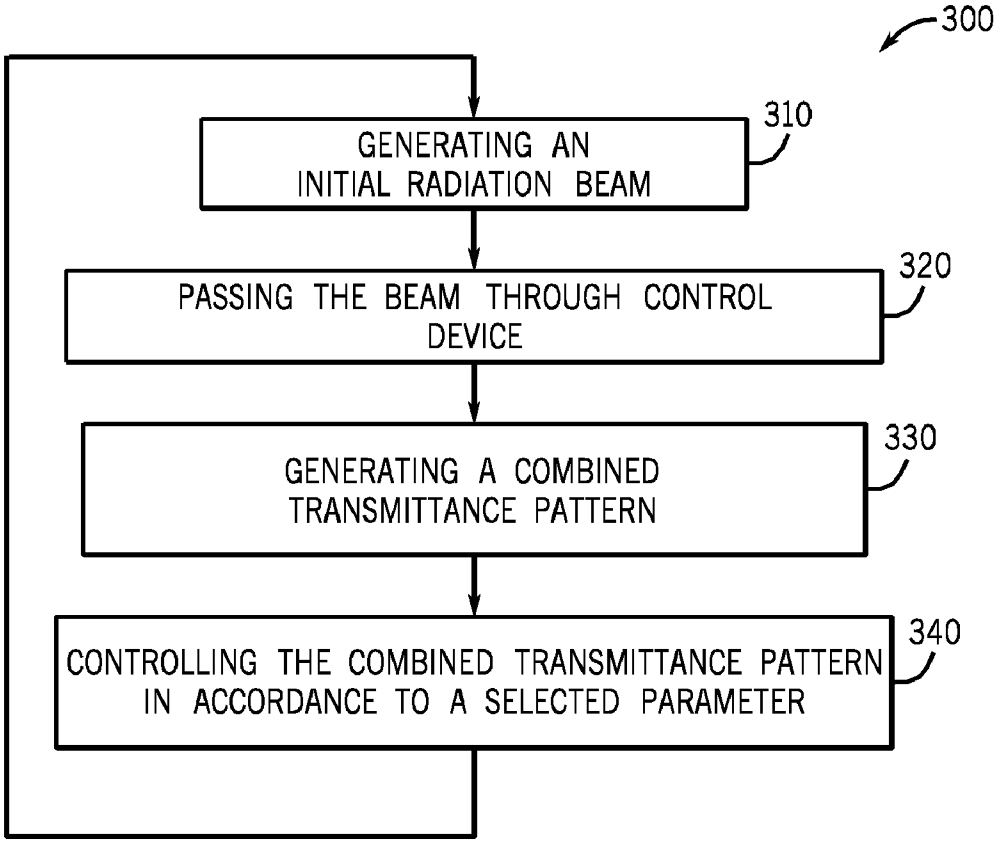
FIG. 6 illustrates an embodiment of a method of controlling a spatial distribution of radiation intensity of a modulated radiation beam.

FIG. 6 illustrates a flow diagram of an embodiment of a method 300 having a technical effect of controlling the combined transmittance pattern 270 (See FIG. 5), or distribution of radiation intensities, of the modified beam 200 output from the control device 196 of the above-described imaging system 100 as illustrated in FIG. 1.

At act 310, the radiation source 105 generates the initial radiation beam 110 of an initial intensity. At act 320, the initial radiation beam 110 is passed through the control device 196. The control device 196 generally includes configurable and independently articulated structures 230 and 260 of radiation absorbing microstructures 235 and 265 superposed in relation to one another and moving together in motion 268 as a solid object.

The control device 196 is operable to regulate the motion 268 so as to cause a selective motion blur effect that smoothens the combined transmittance pattern 270 of attenuated radiation in a controlled manner. The expected motion effect from the exemplary motion 268 of the structures 230 and 260 smoothens the shadow in the combined transmittance pattern 270 in one dimension only, which is sufficient if the microstructures 235 and 265 of the structures 230 and 260, respectively, are oriented orthogonally to the direction of the motion 268. The motion blur does not require that the microstructures 235 and 265 are of extremely fine construction, and does not require reducing the overall spatial resolution of the imaging system 100. Also, even when the motion 268 is the main blurring mechanism, penumbra and optical blur may still contribute to the overall blurring effect, making the requirements on motion blur less stringent. The motion 268 of the of structures 230 and 260 can be caused be oscillation, reciprocating movement, vibration, or trill, etc.

At act 330, the modulated beam 200 is generated having the combined transmittance pattern 270 based on the motion 268 and the superposition of spatial distributions of transmittances across the structures 230 and 260. In one embodiment of act 330, the high-frequency component in the combined transmittance pattern 270 is removed using low-pass filtration in the image acquisition process (e.g. optical blurring, focal spot penumbra, low-pass analog, digital filtration, or blurring due to induced motion of structures 230 and 260). This results in smoothing the combined transmittance pattern 270 and reduces a likelihood of introducing artifacts to the output image 190 (See FIG. 1). In another embodiment of act 330, the superposed structures 230 and 260 of microstructures 235 and 260 are subjected to motion, such as oscillation, during image frame integration to remove identified high-frequency components from the time-integrated combined transmittance pattern 270. In yet another embodiment, the initial beam 105 can be modulated in a time-synchronized manner with the motion 268 of the superposed structures 230 and 260 of microstructures 235 and 265, respectively, to enhance the quality of the spatial smoothing of the combined transmittance pattern 270.

At act 340, the combined transmittance pattern 270 of the superposed structures 250 and 260 of microstructures 255 and 265 is controlled or modulated or adjusted in accordance to one or more selected parameters, including those examples in the following description.

In one example, the act 340 of modulating the combined transmittance pattern 270 is based on a distribution of radiological thickness (for example, based on previous image frames in a fluoroscopic imaging sequence) that is predetermined a priori, anticipated, or measured and stored in a memory storage medium 385 (e.g., hard-drive of a computer, a diskette, a CD, a memory stick, etc.) for access by the beam processor 198, or provided via a input 390 (e.g., keyboard, a touchscreen, etc.). Based at least on the distribution of radiological thickness, the beam processor 198 can create the modulator configuration signal 225 so as to instruct the control device 196 to generate the modulated beam 200 with the combined transmittance pattern 270 so as to increase the radiation dose or intensity to radiographically thick regions and/or decrease the radiation intensity to radiographically thin regions of the imaged subject 104, thereby resulting in the approximate equalization of radiation intensities in the residual beam 210. In this example, the structures 250 and 260 of microstructures 255 and 265, respectively, (See FIG. 4) in the control device 196 are adjustably superposed so as to generate a combined transmittance field or pattern 270 that includes a low-frequency moiré pattern 275 (See FIG. 5) of lower transmittance located where the imaged subject 104 is thinner relative to the transmittance of a remainder part of the combined transmittance pattern 270 applied to the radiological thicker portions of imaged subject 104.

In another example, the act 340 of modulating the combined transmittance pattern 270 is performed based on one or more input data or instructions communicated from an input device (e.g., keyboard, touch-screen, etc.) 390 (See FIG. 1) to the beam processor 198. The input data can specify areas of the imaged subject 104 to receive more or less radiation dose or intensity relative to other remaining areas of the imaged subject 104. In accordance to the input data, the beam processor 198 creates the modulation signal 225 to instruct the control device 196 to produce a desired combined transmittance pattern or distribution of radiation intensities 270 in the modulated beam 200. The combined transmittance pattern 270 includes a low-frequency or moiré pattern 275 (See FIG. 5) of lower transmittance located where indicated per the user instructions.

In another example, the act 340 of modulating the combined transmittance pattern 270 of the modulated beam 110 is performed based on input data indicative of locations of features of interest in the imaged subject 104. The regions of interest may be areas or volumes in the imaged subject 104 that an operator desires to have enhanced resolution. Higher dose rates or intensities of radiation may provide increased spatial resolution, temporal resolution, or grayscale resolution of indicated features of interest. The features of interest in the subject 104 may be known a priori from previous scans or general atlases, programmed, inferred, or anticipated and stored in the memory 385 for access by the beam processor 198. The features of interest may also be specified by the user via the input 390, tracked by navigational-surgical equipment (such as electromagnetic- or optical-tracking), or automatically recognized and tracked by the imaging system 100 in real time. Based on at least the distribution of these regions of interest, the beam processor 198 creates and communicates the modulator configuration signal 225 to instruct the control device 196 to adjust the combined transmittance pattern 270 of the modulated beam 200 to locate moiré patterns 275 (See FIG. 5) of lower transmittance in a manner so as to apply greater radiation intensity or exposure to the features of interest relative to the remainder of combined transmittance pattern of radiation intensity applied to areas of less interest in the subject 104.

In yet another example, the act 340 of modulating the transmittance pattern 270 of the modulated beam 200 from the control device 196 is based on instructions received via the modulation signal 225 from the beam processor 198 so as to generate the modulated beam 200 to have a combined transmittance pattern 270 that reduces the radiation intensity or dose applied to dose-sensitive tissues relative to a remainder of the imaged subject 104. The regions of dose-sensitive tissues of the imaged subject 104 can be predetermined a priori from prior images or general atlases, programmed or anticipated and stored in the memory 385 or provided via the input 390, or a combination of the above. Based on at least this distribution information of these designated dose-sensitive tissues, the beam processor 198 can create the modulator configuration signal 185 so as to instruct the control device 196 to create the modulation beam 200 having the desired combined transmittance pattern 270 with moiré patterns 275 (See FIG. 5) of lower transmittance located so as to result in decreased intensities or doses of radiation to the designated dose-sensitive tissues.

In yet another example, the act 340 of modulating the transmittance pattern 270 of the modulated beam 200 from the control device 196 is correlated to a distribution of regions of motion and change detected in the subject 104. The subject 104 may have regions or volumes that are likely to change or to move relative to other more static regions. For example, the chest cavity of the imaged subject 104 may include the pulsating heart moving relative to the more static thoracic cage. Information indicative of regions of motion in subject 104 may be predetermined a priori, anticipated, or measured and stored in the memory 385 for access by the beam processor 198, or provided by an operator via the input 390. Less exposure is necessary in regions with little motion where image processing techniques may be employed to reuse information from earlier frames to produce a high-quality representation of these static regions. Based on at least the anticipated distribution of motion, the beam processor 198 creates the modulator configuration signal 225 so as to instruct the control device 196 to adjust the modulation beam 200 to have the combined transmittance pattern 270 with moiré pattern 275 (See FIG. 5) of lower transmittance of radiation intensity or dose located to be applied to regions with little or no motion relative to those designated regions. The remainder of the combined transmittance pattern 270 of greater radiation intensity will be applied so as to increase exposure to regions of the subject 104 with motion and change.

In yet another example, the act 340 of modulating the transmittance pattern 270 of the modulated beam 200 from the control device 196 is also based on a comparison of the residual intensity field signal 150 relative to a baseline. The beam processor 198 receives and compares the residual intensity signal 150 relative to a predetermined baseline residual intensity level. Based on the comparison, the beam processor 198 generates the modulator signal 225 with instructions to the control device 196 so as to adjust the transmittance pattern 270 of the modulated beam 200 in a manner to maintain a minimal resolution of the output image 190 created by the image processor 170. Thus, the beam processor 198 completes a periodically or continuously updated feedback loop 215 and 225 to the control device 196 based on the detected residual intensity signal 215. Because the beam processor 198 may "know" the residual intensity field produced using the modulated beam 200 as represented by the residual intensity signal 215, the beam processor 198 may not require transmission of a uniform-beam scout shot so as to estimate radiographic thicknesses of the imaged subject 104. Also, the beam processor 198 can use the information in the residual intensity signal 215 to periodically and/or continually update the beam modulator configuration signal 185 to the control device 196 as the imaged subject 104 moves or changes throughout an imaging session.

In yet another embodiment, the act 340 of modulating the transmittance pattern 270 of the modulated beam 200 from the control device 196 can be adjusted in accordance to any combination of the above-described parameters. For example, the modulation signal 225 from the beam processor 198 can be configured to instruct the control device 196 to create the modulated beam 200 having the combined transmittance pattern 270 so as to equalize distribution in a manner so as to reduce the dynamic range of the intensities in residual beam 210, in accordance to user instructions received via the input 390, so as to cause greater radiation intensity to be applied at features of interest in the imaged subject 104 relative to the remainder of the subject 104, so as to apply greater radiation intensity to regions of expected new information of the imaged subject 104, and to include moiré patterns 275 of lower transmittance at locations of dose-sensitive tissues in the imaged subject 104.

When the beam processor 198 creates the modulator configuration signal 185 based primarily on received information of radiographic thicknesses of the imaged subject 104, the feedback loop 215 and 225 may result in the residual beam 210 being essentially uniform in distribution of radiation intensity, within the performance limitations of the control device 196. In most cases, however, the spatial resolution limitations, the dynamic range limitations, or grayscale resolution limitations of the control device 196 may not allow complete equalization of the residual beam 210. The residual intensity signal 215 may then include information of subject 104 movement or other changes as well as detail that is not resolved by the control device 196. If the modulation capabilities of the control device 196 approach the corresponding image acquisition capabilities of the radiation detector 140, then the residual intensity signal 215 may include noise and motion artifacts that can be useful information about the imaged subject 104.

The beam processor 198 may also be operable to generate the beam intensity signal 180 that includes this useful information described above for communication to the image processor 170. The image processor 170 can add the beam intensity signal 220 to the residual intensity signal 215 in a manner so as to cancel the effects of beam modulation in output image 190. This addition may occur, for example, on a pixel-for-pixel basis. The specific meaning of the addition operation depends on the grayscale transforms applied to the constituent signals 215 and 220. For example, if a logarithmic grayscale transform has been applied to the residual intensity signal 215 and to the beam intensity signal 225, then a simple arithmetic addition may be used. The output image 190 may then accurately represent the true radiographic thickness of the imaged subject 104, as if acquired with a radiation beam having a uniform distribution of radiation intensity. Signal delays may need to be built into the system 100 to ensure that the beam intensity signal 225 are combined with the matching residual intensity signal 215 from the detector 140.

The beam processor 198 can also create the beam intensity signal 220 to include instructions similar to those represented in the modulation signal 225 in accordance to the series of parameters described above (e.g., the region-of-interest, region-of-motion, etc.) for use in making similar adaptations by the image processor 170. These adaptations may include spatial filtration, temporal filtration, feature enhancements, noise suppression, and others. For example, the modulation signal 225 from the beam processor 198 includes instructions to cause less radiation intensity to be applied to locations of less interest as described above, the beam intensity signal 220 from beam processor 198 can include instructions to the image processor 170 so as to increase noise reduction in image processing features of lesser interest. As another example, when the modulation signal 225 from the beam processor 198 includes instructions so as to cause a reduction in the radiation intensity or dose applied to a region where little change or motion is anticipated, then the image processor 170 can be instructed to increase temporal filtration so as to increase the reuse of previous imaged frames to present a high-quality output image 190. Multi-scale image processing schemes may facilitate these solutions.

Figure 7:
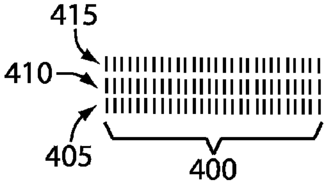
FIG. 7 illustrates a top plan view of an embodiment of a series of structures of microstructures in superposing alignment.

FIG. 7 illustrates a schematic diagram of a top view of an embodiment of a control device 400 that includes a leaf collimator with variable transmittance and variable taper, and having a controllable average transmittance and transmittance gradient comprised of three generally identical, periodic, and linear gratings 405, 410 and 415, each of similar in construction to the structure 230 of microstructures 235 described above, and subjected to a motion 418 and generally arranged in superposing alignment relative to one another when placed in the path of radiation.

Figure 8:
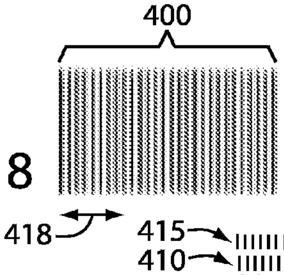
FIG. 8 illustrates an elevation view of the embodiment of structures of microstructures shown in FIG. 7.
Figure 9:
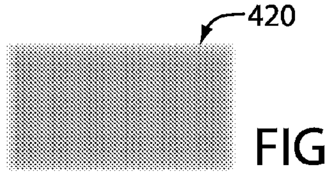
FIG. 9 illustrates an example of an expected combined transmittance pattern of radiation passing through the embodiment of structures of microstructures shown in FIG. 8 subjected to spatial blurring.
Figure 10:
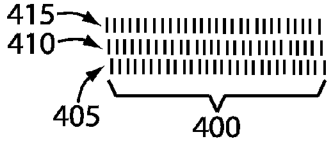
FIG. 10 illustrates a schematic diagram of a top plan view of series of structures in FIG. 7, the series of structures located at an offset relative to one another.
Figure 11:
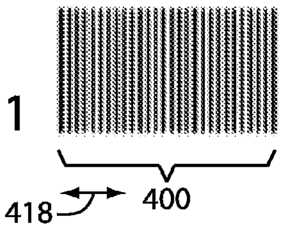
FIG. 11 illustrates a schematic diagram of an elevation view of the series of structures shown in FIG. 10.
Figure 12:
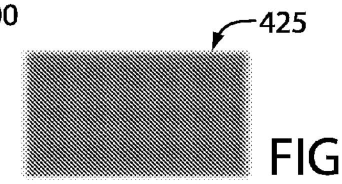
FIG. 12 illustrates an example of an expected combined transmittance pattern of radiation produced by the arrangement of structures in FIG. 11 subjected to spatial blurring.
Figure 13:
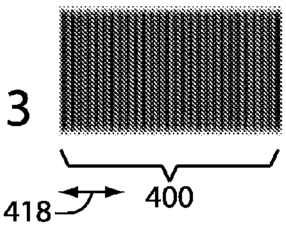
FIG. 13 illustrates a schematic diagram of an embodiment of the series of structures shown in FIG. 8, the series of structures at a greater offset relative to the series of structures in FIG. 11.
Figure 14:
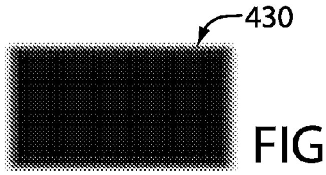
FIG. 14 illustrates an example of an expected combined transmittance pattern of radiation produced by the arrangement of structures in FIG. 11 subjected to spatial blurring.

FIG. 8 illustrates a schematic diagram of an elevation view of the control device 400 of gratings 405, 410 and 415 generally superposed and aligned as shown in FIG. 7. FIG. 9 illustrates the expected transmittance pattern 420 of radiation through the arrangement of the control device 400 shown in FIGS. 7 and 8. The expected combined transmittance pattern 420 is generally the same as the expected transmittance pattern through one of the gratings 405, 410 and 415. FIG. 10 shows a schematic diagram of top view of another arrangement of the gratings 405, 410 and 415 of the control device 400 subjected to motion 418. The gratings 405, 410 and 415 are shifted a lateral distance relative to one another. FIG. 11 shows a schematic diagram of an elevation view of the control device 400 of gratings 405, 410 and 415 generally shifted with respect to one another as shown in FIG. 11. FIG. 12 shows an expected combined transmittance pattern 425 having a transmittance field of decreased radiation intensity (illustrated by the darker contrast) relative to the combined transmittance pattern 420. FIG. 13 illustrates a schematic diagram of yet another arrangement of the gratings 405, 410 and 415 of the control device located at additional shift distance relative to one another. FIG. 14 illustrates an expected combined transmittance pattern 430 of radiation through the arrangement of the control device 400 shown in FIG. 13, illustrating an even lower transmittance relative to the transmittance pattern 425 in FIGS. 9 and 12.

Figure 15:
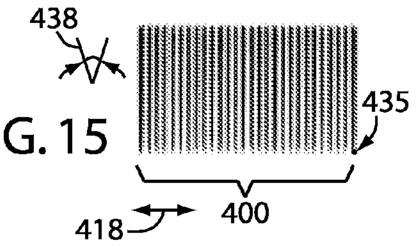
FIG. 15 illustrates a schematic diagram of an embodiment of the series of structures shown in FIG. 8, the series of structures arranged at an offset angle relative to another.
Figure 16:
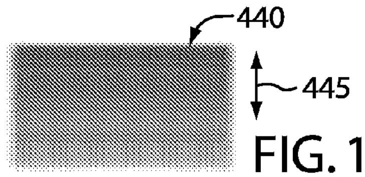
FIG. 16 illustrates an example of an expected combined transmittance pattern of radiation produced by the arrangement of structures in FIG. 15 subjected to spatial blurring.
Figure 17:
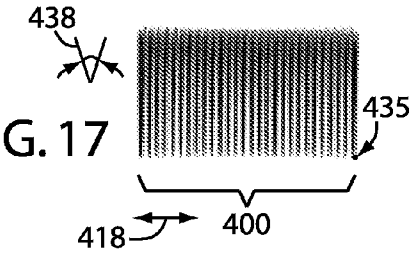
FIG. 17 illustrates a schematic diagram of an embodiment of the series of structures shown in FIG. 8, the series of structures arranged at a greater offset angle relative to the series of structures in FIG. 15.
Figure 18:
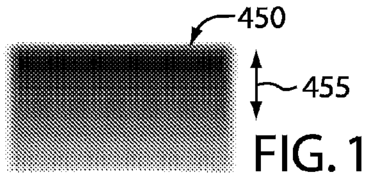
FIG. 18 illustrates an example of an expected combined transmittance pattern of radiation produced by the arrangement of structures in FIG. 17 subjected to spatial blurring.

FIG. 15 illustrates a schematic diagram of yet another arrangement of the gratings 405, 410 and 415 of the control device 400 subjected to motion 418 similar to that shown in FIGS. 7 and 9, where the gratings 405, 410 and 415 are rotated relative to one another by a small angle (illustrated by reference 438) about a point 435. Although the illustrated point 435 is shown at a far end of the gratings 405, 410, and 415, it should be understood that the location of the point 435 relative to the gratings 405, 410, and 415 can vary. FIG. 16 illustrates an expected combined transmittance pattern or field 440 of radiation produced by the arrangement of gratings 405, 410, and 415 of the control device shown in FIG. 15. The expected combined transmittance pattern 440 includes a gradient of transmittance from higher to lower (illustrated by arrow and reference 445) in a direction away from point 435 of angular rotation. FIG. 17 shows the arrangement of gratings 405, 410, and 415 of the control device 400 positioned at the angle of displacement 438 with respect to one another about point 435, the angle 438 greater relative to the arrangement shown in FIG. 15. FIG. 18 illustrates an expected combined transmittance pattern 450 produced by the arrangement of gratings 405, 410, and 415 shown in FIG. 17. The combined transmittance pattern 450 includes a gradient 455 of transmittance away from point 435 that is greater relative to the gradient 445 in FIG. 16. Thereby, FIGS. 16 and 18 illustrate how the gradients 445 and 455 are selectively adjustable with the angle of displacement 438 of the gratings 405, 410 and 415. Thus, the control device 400 can include and/or substitute a varying number of tapered gratings 405, 410, and 415 of various shapes, thicknesses and displacement angles 438 with greater flexibility.

Although the above described embodiments of the control devices 115, 400 and 470 are described comprised of generally periodic arrangements of microstructures, more complex moiré patterns 275 can arise from the superposition non-periodic repeating microstructure patterns, examples of which are described below.

Figure 19:
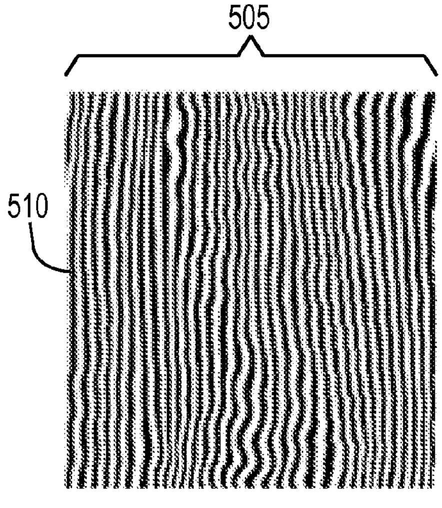
FIG. 19 illustrates a schematic diagram of another embodiment of a radiation absorbing structure with a first phase-modulated grating of non-linear shape.
Figure 20:
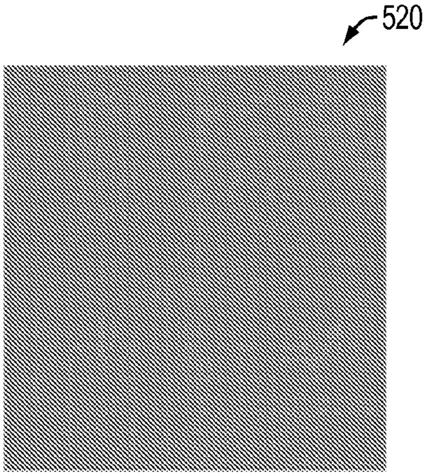
FIG. 20 illustrates an example of an expected transmittance field of radiation produced by the structure in FIG. 19 subjected to spatial blurring.
Figure 21:
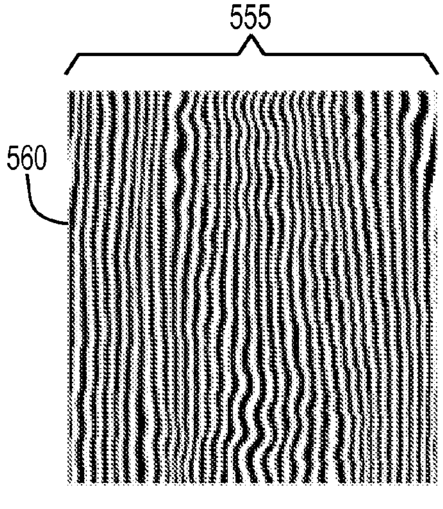
FIG. 21 illustrates a schematic diagram of an embodiment of a radiation absorbing structure with a second phase-modulated grating of non-linear shape designed to work in combination with the structure in FIG. 19.
Figure 22:
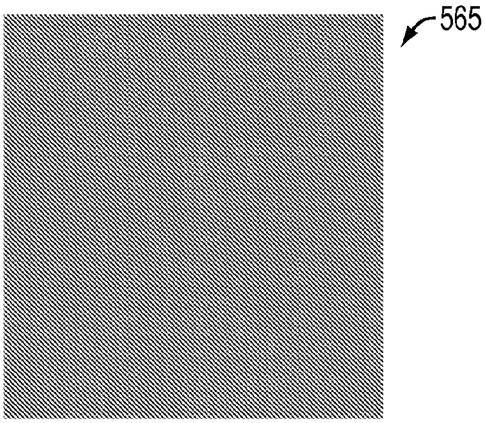
FIG. 22 illustrates an example of an expected transmittance field of radiation produced by the structure in FIG. 21 subjected to spatial blurring.
Figure 23:
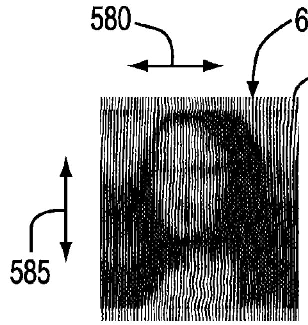
FIG. 23 illustrates a schematic diagram of an arrangement of the structure shown in FIG. 19 in superposing relation to the structure shown in FIG. 21 and an image.
Figure 24:
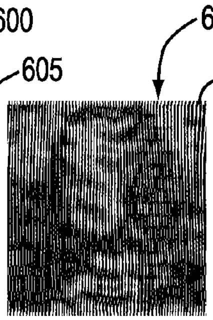
FIG. 24 illustrates a schematic diagram of another arrangement of the structure shown in FIG. 19 in superposing relation to the structure shown in FIG. 21 and an image.
Figure 25:
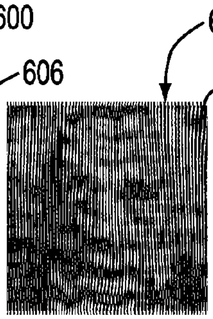
FIG. 25 illustrates a schematic diagram of another arrangement of the structure shown in FIG. 19 in superposing relation to the structure shown in FIG. 21 and an image.
Figure 26:
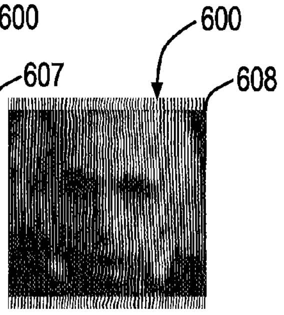
FIG. 26 illustrates a schematic diagram of another arrangement of the structure shown in FIG. 19 in superposing relation to the structure shown in FIG. 21 and an image.
Figure 27:
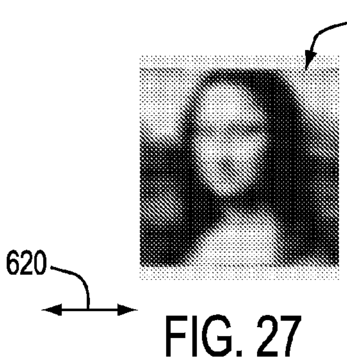
FIG. 27 illustrates an example of an expected combined transmittance of the image through the arrangement of structures in FIG. 23 subjected to spatial blurring.
Figure 28:
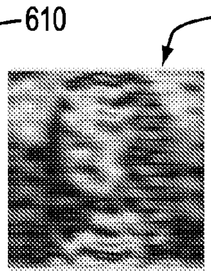
FIG. 28 illustrates an example of an expected combined transmittance of the image through the arrangement of structures in FIG. 24 subjected to spatial blurring.
Figure 29:
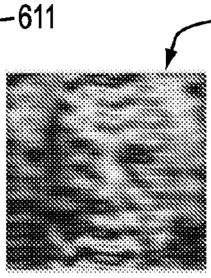
FIG. 29 illustrates an example of an expected combined transmittance of the image through the arrangement of structures in FIG. 25 subjected to spatial blurring.
Figure 30:
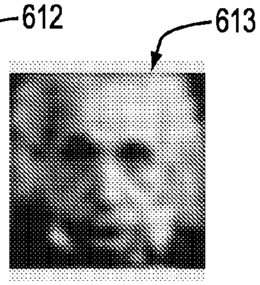
FIG. 30 illustrates an example of an expected combined transmittance of the image through the arrangement of structures in FIG. 26 subjected to spatial blurring.

FIG. 19 illustrates a schematic diagram of an embodiment of a structure 505 of microstructures 510 subjected to motion (illustrated by arrow and reference 512). The microstructures 510 are non-periodically shaped in relation to one another. FIG. 20 illustrates an expected transmittance field 520 of radiation produced by the structure 505 of microstructures 510 subjected to spatial blurring associated with motion 512. The combined transmittance field 520 is generally uniform in attenuation of radiation. FIG. 21 illustrates another embodiment of a structure of 555 of non-periodically or non-repeating shaped microstructures 560 subjected to a motion 562. FIG. 22 illustrates an expected transmittance field 565 produced by the structure 555 subjected to spatial blurring associated with motion 562.

FIGS. 23 through 26 illustrate examples of expected combined transmittance fields 600, 601, 602 and 603 respectively, produced by superposing arrangements of the structures 505 and 555 (described in FIGS. 19 and 21) aligned at increasing lateral offsets relative to one another, ranging from a zero longitudinal (vertical) offset (FIG. 23) to greatest longitudinal (vertical) offset (FIG. 26) in the direction illustrated by arrow 585. Each expected transmittance field 600, 601, 602 and 603 includes high frequency components or fields 605, 606, 607 and 608 that are of general alignment with the microstructures 510 or 560 of the structures 505 and 555 (See FIGS. 19 and 21). FIGS. 27 through 30 show examples of expected combined transmittance fields 610, 611, 612, and 613 to illustrate a desired effect of spatial smoothing or blurring caused by subjecting the superposing structures 505 and 555 (See FIGS. 19 and 21, respectively) to motion in a direction 620 (See FIG. 27) in reducing or removing the high frequency component or field 605, 606, 607 and 608 in the combined transmittance fields 600, 601, 602 and 603 illustrated in FIGS. 22 through 26, respectively. It is apparent that each of the illustrated transmittance fields 610, 611, 612, and 613 are generally are smoother in transition in the direction 620 of motion due to the respective removal of the sharp, high frequency components 605, 606, 607, and 608 because of the blurring effect associated with the motion 620.

Figure 31:
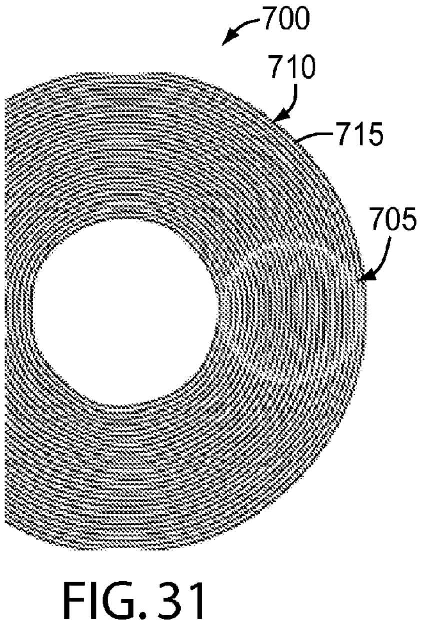
FIG. 31 illustrates a view of an embodiment of a control device comprised of superposing generally identical disks having curvilinear phase-modulated microstructures.
Figure 32:
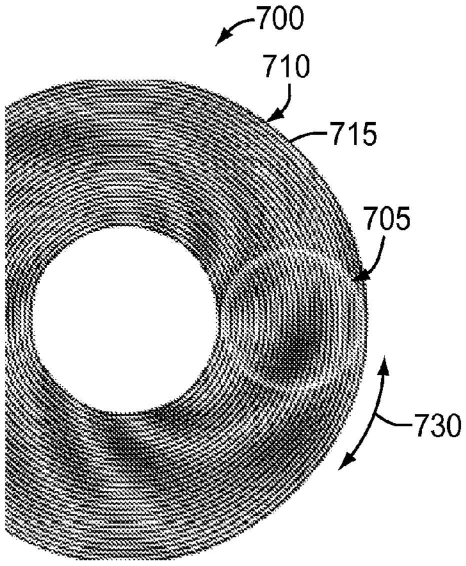
FIG. 32 illustrates a view of the embodiment of the control device in FIG. 31, the disks of curvilinear phase-modulated microstructures rotationally offset with respect to one another.
Figure 33:
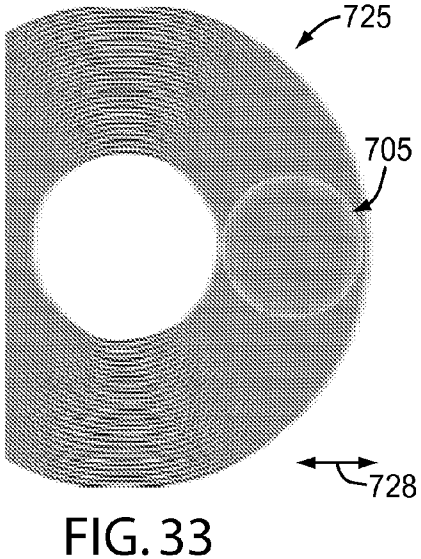
FIG. 33 illustrates an example of an expected combined transmittance of a radiation beam through the arrangement of FIG. 31 subjected to spatial blurring in the horizontal direction.
Figure 34:
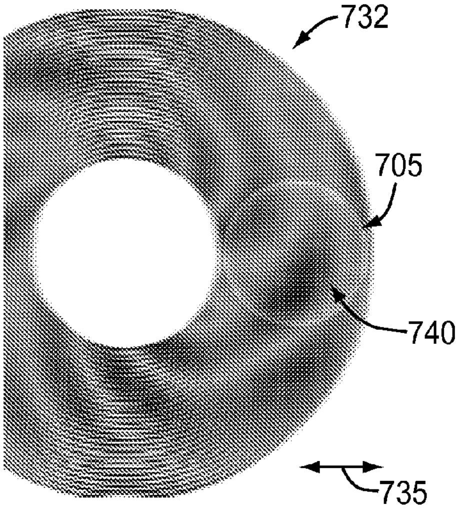
FIG. 34 illustrates an example of an expected combined transmittance of a radiation beam through the arrangement in FIG. 32 subjected to spatial blurring in the horizontal direction.

FIG. 31 illustrates another embodiment of a control device 700 operational in a manner similar to the beam control device 196 in FIG. 1. The control device 700 is generally configured to control transmittance of radiation through a control region 705. As shown in FIG. 31, the control device 700 comprises a generally identical pair of structures or disks 710 of microstructures 715 aligned in superposing relation to one another so as to appear as one. The microstructures 715 are comprised of generally concentric-shaped radiation-absorbing material, with transparent spaces located therebetween. Yet, the microstructures 715 are shaped to deviate from a perfect circle. FIG. 32 illustrates an expected combined transmittance field or pattern 725 produced by the arrangement of microstructures 715 in FIG. 31 subjected to a motion (illustrated by arrow and reference 728). The portion of the combined transmittance field 725 located in the control region 705 is generally uniform. FIG. 33 illustrates the control device 700 shown in FIG. 31 with the structures 715 positioned at a rotational displacement 730 relative to one another. FIG. 34 illustrates an expected combined transmittance pattern 732 produced by the control device 700 as created by the rotational displacement 730 of microstructures 715 in FIG. 33 subject to a motion 735. The controlled rotational displacement of the structures 705 creates an expected moiré pattern 740 of low-frequency fields of radiation energy located in the control region 705 of the control device 700. FIGS. 31 through 34 generally illustrate how various rotational displacement 730 of the two disks 710 relative to one another and subjected to motion 728 and 735 are expected to produce a variety of transmittance fields 725 and 730 in the controlled region 705.

Furthermore, the various arrangements of the structures 230, 260, 405, 410, 415, 505, 555, and 710 can be encoded at the control devices 196, 400, and 700 or at the beam processor 198 so as to more readily create or locate or change a shape of one or more moiré patterns 275, and 740 in the combined transmittance patterns 270 420, 425 430, 440, 450, 600, 601, 602, 603, 610, 611, 612, 613, 725 and 732.

In accordance with the above-description, the imaging system 100 and method 300 are operable to increase radiation dose efficiency, thereby reducing average radiation exposure to the imaged subject 104 and/or the operators of the imaging system 100. In medical imaging, the radiation dose efficiency may be defined as the ratio of the theoretically minimal radiation energy absorbed in the subject 104 relative to the practically achievable total radiation energy absorbed in the subject 104 in the production of a specific projection image of adequate clinical quality. One way to achieve maximum dose efficiency is to regulate the least practically achievable total radiation energy entering the subject 104 that is sufficient in the production of a specific image of adequate clinical quality. The embodiments of the imaging system 100 and method 300 provides dynamic control of the non-uniform distribution of radiation intensities of the modulated beam 200 in a manner as described above so as to provide the least practically achievable radiation energy through the subject 104 to produce a quality output image 190.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention as set forth in the following claims.

What is claimed is:

1. A method for selectively controlling a spatial distribution of radiation intensity of an output radiation beam of an imaging device operable to create an output image of a subject, the method comprising the acts of:

(a) passing an initial radiation beam through a control device comprising a first radiation absorbing structure in alignment relative a second radiation absorbing structure to receive the radiation beam, wherein at least one of the first and second radiation absorbing structure is configured to articulate;

(b) adjusting a position of the first radiation absorbing structure in relation to a position of the second radiation absorbing structure in accordance to a modulator configuration signal;

(c) creating a combined transmittance pattern that includes a moiré pattern having a lower frequency field of transmittance not found in a transmittance field produced from one of the first and second radiation absorbing structures;

(d) locating the moiré pattern so as to direct the lower frequency transmittance of the output radiation beam at the subject.

2. The method as in claim 1, the method further comprising the act of reducing a higher frequency field of transmittance in the combined transmittance pattern while maintaining the lower frequency field of transmittance of the moiré pattern.

3. The method as in claim 2, wherein the act of reducing the high frequency field of transmittance includes the act of putting at least one of the first and second radiation absorbing structures in motion.

4. The method as in claim 3, wherein the act of putting one of the first and second radiation structures in motion is in a direction generally parallel to a plane of alignment of one of the first and second radiation absorbing structures.

5. The method in claim 3, wherein the radiation intensity of the initial beam is modulated in time synchronization with the motion of the at least one of the first and second radiation absorbing structures.

6. The method as in claim 1, wherein the first radiation absorbing structure is comprised of a first plurality of spatially distributed radiation absorbing microstructures generally aligned in a first plane, and wherein the second radiation absorbing structure includes a second plurality of spatially distributed radiation absorbing microstructures generally aligned along a second plane generally parallel to the first plane.

7. The method as in claim 6, further including the act of creating an lateral offset of the first radiation absorbing structure in a direction along the first plane from superimposed alignment relative to the second radiation absorbing structure so as to selectively adjust a location of the moiré pattern in the combined transmittance pattern.

8. The method as in claim 1, wherein the moiré pattern increases a variation in the spatial distribution of radiation intensity of the modulated beam.

9. The method as in claim 1, further including the act of creating a rotational offset of the first radiation absorbing structure relative to superposed alignment with the second radiation absorbing structure so as to selectively adjust the moiré pattern in the combined transmittance field.

10. The method as in claim 1, wherein the acts of creating and locating the moiré pattern is in accordance to at least one parameter of the group consisting of: a location of interest in the subject, a location of expected new information in the subject, locations of regions of motion in the subject, and a location of radiation-sensitive tissue in the subject.

11. The method of claim 1, wherein at least one of the first and second radiation absorbing structures includes a plurality of microstructures of non-periodic shape relative to one another.

12. A system to adjust an intensity of radiation beam received from a radiation source to be transmitted to toward a subject, comprising:

a control device that includes a first radiation absorbing structure located at a position in alignment relative a position of a second radiation absorbing structure to receive the radiation from the radiation source, wherein at least one of the first and second radiation absorbing structure is configured to articulate; and a beam processor configured to create a modulator configuration signal to cause adjustment of the position of at least one of the first and second radiation absorbing structures relative to the other so as to selectively create a combined transmittance pattern comprising a moiré pattern having a lower frequency field of transmittance not found in a transmittance field produced from one of the first and second radiation absorbing structures, wherein the modulator signal further locates the moiré pattern so as to direct an output radiation beam leaving therefrom at a desired location of the subject.

13. The system as in claim 12, wherein the combined transmittance pattern that includes the moiré pattern has a greater variation in a spatial distribution of radiation intensity than without the moiré pattern.

14. The system as in claim 12, wherein the control device is operable to reduce a higher frequency portion of field of transmittance in the combined transmittance pattern while maintaining the lower frequency portion of field of transmittance of the moiré pattern.

15. The system as in claim 12, wherein the first radiation absorbing structure is comprised of a plurality of spatially distributed microstructures generally aligned along a first plane and connected to move together, wherein the second radiation absorbing structure is comprised of a plurality of spatially distributed microstructures generally aligned along a second plane and connected to move together, and wherein the first plane is generally parallel to the second plane.

16. The system as in claim 12, wherein the control device reduces the higher frequency field of transmittance by moving the first and second radiation absorbing structures in a generally orthogonal direction to a direction of the initial radiation beam.

17. The system as in claim 12, wherein the control device adjusts at least one of a shape and a location of the moiré pattern in the combined transmittance pattern by causing a selective lateral displacement of the first radiation absorbing structure along a first plane from generally superposing alignment with the second independently articulating radiation absorbing structure.

18. The system as in claim 12, wherein the control device adjusts a location of the moiré pattern by causing a rotational offset between the first and second independently articulating radiation absorbing structure.

19. The system as in claim 18, wherein the beam processor creates the modulator configuration signal for communication to the control device in accordance to at least one parameter of the group consisting of a location of interest in the imaged subject, a location of expected new information in the imaged subject, locations of regions of motion in the imaged subject, and a location of radiation-sensitive tissue in the imaged subject.

20. The system as in claim 12, wherein at least one of the first and second radiation absorbing structures includes a plurality of microstructures of non-periodic shape relative to one another.

* * * * *